Patented Nov. 13, 1951

2,575,125

UNITED STATES PATENT OFFICE 2,575,125

BUTADIENE AND 1,1,2-TRICHLORO-3,3,3-TRIFLUOROPROPENE-1

Maurice Prober, Schenectady, N. Y., assignor to General Electric Company, a corporation of New York No Drawing. Application March 30, 1949,
Serial No. 84,488

1 Claim. (Cl. 260—82.1)

This invention relates to the production of new materials having valuable and characteristic properties that make them especially suitable for use in industry, for example, in molding, laminating, coating and adhesive applications and for other purposes. The invention is concerned more particularly with compositions of matter comprising the product of copolymerization of a mass containing (1) a diene hydrocarbon and (2) a fluorinated, unsaturated compound selected from the class consisting of 1,1,2-trichloro-3,3,3-trifluoropropene-1, 2,3-dichloro-1,1,1,4,4,4 - hexafluorobutene - 2, 1,2 - dichloro - 3,3,4,4,5,5-hexafluorocyclopentene-1, hexafluorocyclobutene, and mixtures thereof.

The term "diene hydrocarbon" as employed in the specification and in the claim appended hereto is intended to include unsaturated hydrocarbons containing conjugated unsaturation especially compounds corresponding to the formula

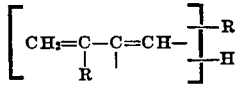

where R is a member of the class consisting of hydrogen and the methyl radical, as for example, butadiene-1,3, pentadiene-1,3, 2-methyl pentadiene-1,3, 2,3-methylbutadiene-1,3, 2-methylbutadiene-1,3, etc. The foregoing formula includes butadienes of the formula

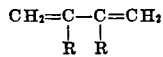

where R has the meaning given above.

Heretofore, unsaturated, halogenated organic compounds have been copolymerized with a diene hydrocarbon with great difficulty. I have now discovered that I am able to effect polymerization of a diene hydrocarbon and a specific class of halogenated, unsaturated organic compounds to obtain true copolymers (interpolymers).

The products obtained as a result of my discovery have properties which range, for example, from hard, tough, insoluble, and infusible bodies both in film form and when molded in large sizes, to soften bodies or rubbery masses. In general, the properties of these new products are such as to render them suitable for a wide variety of technical applications.

In practicing the present invention, the mixture of the diene hydrocarbon and one or more of the unsaturated, fluorinated compound mentioned previously may be polymerized, for instance, in mass or in emulsion or in dispersion form, under suitable conditions, preferably though not essentially in the presence of a polymerization (e. g., a vinyl polymerization) catalyst.

The emulsions or dispersions are preferably prepared in a water medium under the influence of appropriate dispersing or emulsifying agents, e. g., the water-soluble soaps, polyvinyl alcohol, the water-soluble salts of polymerized methylene polycarboxylic acids, the water-soluble salts of sulfosuccinic esters, etc. Solutions of the comonomers may also be subjected to polymerizing conditions. Atmospheric, subatmospheric, and superatmospheric pressure conditions may be used without departing from the scope of the invention.

Although the polymerization catalyst may be omitted and reaction effected under the influence of, for example, heat or light (such as actinic light), or heat and light, I prefer to carry out the reaction in the presence of such a polymerization catalyst in order to reduce the time necessary to cause the reaction to go to completion.

Examples of polymerization catalysts which may be used are, for instance, ozone, ozonides, inorganic super-oxides such as barium peroxide, sodium peroxide, etc., aliphatic acyl peroxides, e. g., acetyl peroxide, lauryl peroxide, stearyl peroxide, etc.; peroxides of the aromatic acid series, e. g., benzoyl peroxide, etc.; various per-compounds, such as perborates, persulfates, perchlorates, tertiary butyl perbenzoate, tertiary butyl hydroperoxide-1, etc.; aluminum salts such as the halides, organic and inorganic acids such as methacrylic acid, hydrofluoric acid, etc.; metal compounds of the unsaturated acids as, for instance, cobalt and manganese resinates, linoleates, maleates, etc. Benzoyl peroxide and potassium persulfate are the preferred catalysts although it will, of course, be apparent to those skilled in the art that other polymerization catalysts may be employed without departing from the scope of the invention.

Any suitable amount of polymerization catalyst may be used. In general the catalyst concentration will be within the range of from about 0.01 to 2.0 per cent, by weight, of the total weight of the diene hydrocarbon and the unsaturated, halogenated organic compound.

As pointed out previously, any suitable method may be employed for preparing the claimed compositions of matter. I have found that effecting the copolymerization in an emulsion system gives satisfactory results. When such a system is employed any suitable emulsifying agent well known in the art, many examples of which have been given previously, may be used in forming the emulsion of the water and the copolymerizable ingredients.

Copolymerization may be effected at from below 0° C. to about room temperature (20° to 30° C.) or higher, for instance, to temperatures above 100°, for example, about 130° C. Ordinarily I may employ temperatures within the range of from about 40 to 120° C. in causing the mixed components to interpolymerize.

During the interpolymerization (i. e., copolymerization) step I may add to the reacting mixture various modifying agents such as those often employed for modifying the properties of diene hydrocarbon products as, for instance, mercaptans, etc. The function of such materials is to affect the molecular structure of the final interpolymerization product.

In order that those skilled in the art may better understand how the present invention may be practiced, the fololwing examples are given by way of illustration and not by way of limitation. All parts are by weight.

In effecting copolymerizaion of the ingredients in Example 1, the fluorinated monomer and the diene hydrocarbon, namely butadiene-1,3, were mixed together in a bomb and 2 per cent benzoyl peroxide, by weight, based on the total weight of the comonomers was added. Thereafter the bomb was closed and the mixture heated for about 72 hours at 60 to 65° C. At the end of the reaction, the unreacted monomers were removed by heating the polymer under vacuum.

EXAMPLE 1

In this example butadiene-1,3 was coreacted, respectively, with 1,1,2-trichloro-3,3,3-trifluoropropene-1 ($CCl_2=CClCF_3$), 2,3-dichloro-1,1,1,4,4,4-hexafluorobutene-2 ($CF_3CCl=CClCF_3$), 1,2-dichloro-3,3,4,4,5,5-hexafluorocyclopentene-1

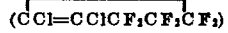

($\overline{CCl=CClCF_2CF_2CF_2}$)

and hexafluorocyclobutene

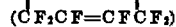

($\overline{CF_2CF=CFCF_2}$)

The following table shows the weight proportions of the comonomers together with the description of the product obtained:

After charging the foregoing ingredients to the reactor, the reactor was closed and shaken for 24 hours at 48-51° C. The latex which resulted from such treatment was thereafter coagulated with a 2.5 per cent sulfuric acid solution saturated with sodium chloride, and the gum washed with distilled water and dried in an oven under vacuum at 70° C.

The elastic gum obtained above in Example 2 was compounded on rubber compounding rolls with various other ingredients using the following formulation:

| | Parts |
|---|---|
| Rubbery copolymer | 27.0 |
| Zinc oxide | 1.35 |
| Carbon black | 11.3 |
| Sulfur | 0.54 |
| Tuads (tetramethyl thiuram disulfide) | 0.27 |
| Captax (mercaptobenzothiazole) | 0.14 |

The compounded material was cured for 25 minutes at 150° C. in a closed mold under pressure. The rubbery flexible vulcanizate had a tensile strength of 723 pounds per sq. inch, 127 per cent elongation and a shore hardness of 60. After 48 hours immersion in toluene and kerosene at 60-65° C., samples of this vulcanizate had increased in weight 29 per cent and 16 per cent, respectively, less than the weight increase of a butadiene-styrene rubbery vulcanized copolymer (GR-S) in the same hydrocarbons.

It will, of course, be understood by those skilled in the art that other proportions of diene hydrocarbon and the unsaturated, fluorinated compound may be employed in addition to the proportions disclosed in the foregoing examples without departing from the scope of the claimed invention. The ultimate properties of the copolymer will depend upon the proportion of the individual monomers present therein. Thus, I may use, for example, from 1 to 99 per cent, by weight, of the diene hydrocarbon and from 99 to 1 per cent, by weight, of the unsaturated, fluorinated monomer. Preferably, I employ from 1 to 50 per cent, by weight, of the unsaturated, fluorinated monomer, based on the total weight of the latter and the diene hydrocarbon. Use of such a proportion of ingredients results in elastic, rubbery products having good flexibility.

Table

| Fluorinated Monomer | Parts Fluorinated Monomer | Parts Butadiene-1,3 | Properties of Copolymer |
|---|---|---|---|
| $CCl_2=CClCF_3$ [1] | 73 | 30 | Flame-resistant, rubbery gum. |
| $CF_3CCl=CClCF_3$ [2] | 80 | 25 | Do. |
| $\overline{CCl=CClCF_2CF_2CF_2}$ [3] | 68 | 24 | Do. |
| $\overline{CF_2CF=CFCF_2}$ [4] | 71 | 34 | Do. |

[1] Directions for preparing this compound may be found in J. A. C. S. 63, 3478 (1941).
[2] Directions for preparing this compound may be found in J. A. C. S. 69, 1820 (1947).
[3] Directions for preparing this compound may be found in J. A. C. S. 67, 1235 (1945).
[4] Directions for preparing this compound are disclosed in J. A. S. C. 69, 279 (1947).

EXAMPLE 2

In this example, the following ingredients were charged to a pressure reactor:

| | Parts |
|---|---|
| Butadiene-1,3 | 180 |
| $CF_3CCl=CCl_2$ | 60 |
| t-Dodecyl mercaptan | 1 |
| An aqueous solution containing 1 part potassium persulfate, 17 parts Ivory soap and 3 parts borax | 650 |

In the prepartion of my claimed compositions of matter, other copolymerizable materials may be added to the mixture of the diene hydrocarbon and the unsaturated fluorinated compound prior to effecting polymerization of the mass, such as, e. g., styrene, acrylic acid esters (ethyl acrylate, methyl methacrylate, etc.), acrylonitrile, etc. The introduction of such copolymerizable materials aids in modifying the properties of the final product to lend thereto certain additional desirable characteristics.

Vulcanization may be accomplished through any of the numerous methods used to vulcanize natural, reclaimed, or synthetic rubber, such as by means of certain nitro compounds, benzoquinone dioxime, thiuram derivatives, sulfur, lead oxide, the guanidines, e. g., diphenyl guanidine, salts of thiuram derivatives, etc.

The heat convertible products of this invention are compatible with numerous natural and synthetic bodies. For example, they can be suitably processed with all types of reclaimed rubber, natural rubber, and the synthetic resins, various vinyl resins (such as polystyrene, polyvinyl acetals, etc.), vinyl halide resins, polyalkylene sulfides, etc.

The claimed compositions of matter have utility as coating or impregnating materials. Thus, in the uncured, i. e., unvulcanized state, they may be extruded over electrical conductors for insulation purposes and the coated conductors thereafter heat-treated to effect curing of the insulation. In addition, solutions of the claimed compositions of matter may be used for coating and impregnating fibrous sheets which can be superposed upon each other and pressed at elevated temperatures to form cohesive laminated products having many desirable properties.

In addition to using the new claimed compositions alone, they may also be employed with fillers or other modifying agents such as finely divided Alundum (for abrasive wheels), wood flour, zinc oxide, celite, clay, whiting, ferric oxide, mica, glass fibers, etc., which can be used in various molding applications. They may also be molded by injection, extrusion or compression molding techniques to yield molded articles of manufacture for various industrial, household and novelty uses.

What I claim as new and desire to secure by Letters Patent of the United States is:

A composition of matter comprising the product of copolymerization under heat of a mixture comprising, by weight, (a) from 25 to 73 per cent 1,1,2-trichloro-3,3,3-trifluoropropene-1 and (b) from 75 to 27 per cent, by weight, butadiene-1,3, the total weight of (a) and (b) being equal to 100%.

MAURICE PROBER.

REFERENCES CITED

The following references are of record in the file of this patent:

UNITED STATES PATENTS

| Number | Name | Date |
|---|---|---|
| 2,333,403 | Youker | Nov. 2, 1943 |
| 2,436,142 | Harmon | Feb. 17, 1948 |